United States Patent [19]

Okuno et al.

[11] Patent Number: 4,690,909
[45] Date of Patent: Sep. 1, 1987

[54] SILICON CARBIDE-GRAPHITE COMPOSITE MATERIAL AND PROCESS FOR PRODUCING SAME

[75] Inventors: Akiyasu Okuno; Masakazu Watanabe, both of Aichi, Japan

[73] Assignee: NGK Spark Plug Co., Ltd., Japan

[21] Appl. No.: 860,316

[22] Filed: May 6, 1986

Related U.S. Application Data

[63] Continuation of Ser. No. 558,725, Dec. 6, 1983, abandoned.

[30] Foreign Application Priority Data

Dec. 6, 1982 [JP] Japan ................................ 57-212793

[51] Int. Cl.$^4$ ............................................. C04B 35/56
[52] U.S. Cl. .................................... 501/90; 423/345; 501/88
[58] Field of Search ..................... 501/88, 90; 423/345

[56] References Cited

U.S. PATENT DOCUMENTS

| | | | |
|---|---|---|---|
| 3,836,673 | 9/1974 | Weaver et al. ...................... | 423/345 |
| 3,966,855 | 6/1976 | Hollenberg et al. .................. | 501/88 |
| 4,004,934 | 1/1977 | Prochazka ............................ | 501/90 |
| 4,041,117 | 8/1977 | Prochazka ............................ | 501/90 |
| 4,230,497 | 10/1980 | Schwetz et al. ..................... | 501/90 |
| 4,295,890 | 10/1981 | Stroke .................................. | 264/65 |
| 4,336,216 | 6/1982 | Watanabe et al. .................... | 501/90 |

*Primary Examiner*—William R. Dixon, Jr.
*Assistant Examiner*—Steven Capella
*Attorney, Agent, or Firm*—Sughrue, Mion, Zinn, Macpeak, and Seas

[57] ABSTRACT

A silicon carbide-graphite composite material is disclosed. The composite material includes graphite as a secondary phase which are dispersed uniformly in a grain boundary of the silicon carbide. The graphite have an average grain size of not more than 3 μm and are present in a proportion of 1 to 20 vol % based on the volume of the silicon carbide. The composite material has a density greater than 90% of the theoretical density. A process for producing the silicon carbide-graphite composite material is also disclosed. The composite material is a high-density and high-strength material.

10 Claims, 5 Drawing Figures

CALCINED (SINTERED)

SILICON CARBIDE-GRAPHITE COMPOSITE MATERIAL AND PROCESS FOR PRODUCING SAME

This is a continuation of application Ser. No. 558,725, filed Dec. 6, 1983, abandoned.

FIELD OF THE INVENTION

The present invention relates to a high-density and high-strength silicon carbide-graphite composite material and a process for producing the same.

BACKGROUND OF THE INVENTION

Because of its excellent chemical and physical properties, silicon carbide has potential applications as structural materials for use in high-temperature environments, sliding materials or corrosion-resistant materials, which include mechanical seal rings, plungers, bearings, sand blast nozzles, tappets and microwave absorbers.

Silicon carbide sintered product is conventionally produced by reaction sintering, hot pressing or pressureless sintering. Of these methods, the pressureless sintering is most commonly used. In order to improve the sinterability of silicon carbide, various sintering aids have recently been developed.

Two typical methods have been developed for the sintering of silicon carbide are hereunder described according to crystal form.

First, Japanese Patent Application (OPI) No. 148712/76 corresponding to U.S. Pat. No. 4,124,667 (the term "OPI" as used herein refers to "published unexamined Japanese patent application") describes a method wherein α-silicon carbide is mixed with 0.15 to 3.0 wt% of boron, 0.5 to 5.0 wt% of a carbonized organic material and up to 1.0 wt% of an additional carbon. The mixture is molded into a suitable shape and then the molded product is sintered so as to provide a density of at least 2.4 g/cm$^3$ which is greater than 75% of theoretical density Second, Japanese Patent Application (OPI) No. 78609/75 corresponding to U.S. Pat. No. 4,004,934 describes a process for producing sintered silicon carbide with a density not smaller than 85% of theoretical density by sintering a molded mixture of β-silicon carbide with a boron compound corresponding to 0.3 to 3.0 wt% of boron and a carbonaceous additive corresponding to 0.1 to 1.0 wt% of carbon. According to the specification, the function of carbonaceous additive is to reduce silica which always is present in silicon carbide powder in small amounts or which forms on heating from oxygen absorbed on the powder surfaces. The other function of the carbonaceous additive acts as a getter for free silicon. If this additive is incorporated in an amount of more than 1.0 wt%, the unreacted excess carbon tends to form voluminous grains in the sintered silicon carbide that act much like permanent pores and such excess thereby limits the ultimate achievable density and strength.

However, whether the silicon carbide is in the α- or β-form, if sintering is effected at temperatures higher than 2,000° C. in an attempt to obtain a dense product, β-silicon carbide experiences grain growth as it is transformed to α-silicon carbide. Further α-silicon carbide also undergo grain growth although no phase transformation occurs. In any event, it has been impossible to obtain a dense and microfine sintered product by any of the two prior art techniques.

SUMMARY OF THE INVENTION

The present invention have determined that carbon is effective in inhibiting the grain growth of silicon carbide during the sintering and have found that 1 to 20 vol% of carbon black based on the volume of silicon carbide incorporated in addition to the sintering aids will inhibit the grain growth of silicon carbide during sintering whereas the same carbon black is converted into graphite so as to produce a composite material wherein the resulting microfine graphite as a secondary phase of the composite material are uniformly dispersed through a grain boundary of silicon carbide of the composite material.

This composite material has a dense and microfine structure which exhibits high mechanical strength and great thermal shock resistance.

BRIEF DESCRIPTION OF THE DRAWINGS

FIG. 2(a) shows the sample prepared from a powder mixture containing neither carbon black nor graphite.

DETAILED DESCRIPTION OF THE INVENTION

Figure 1A:
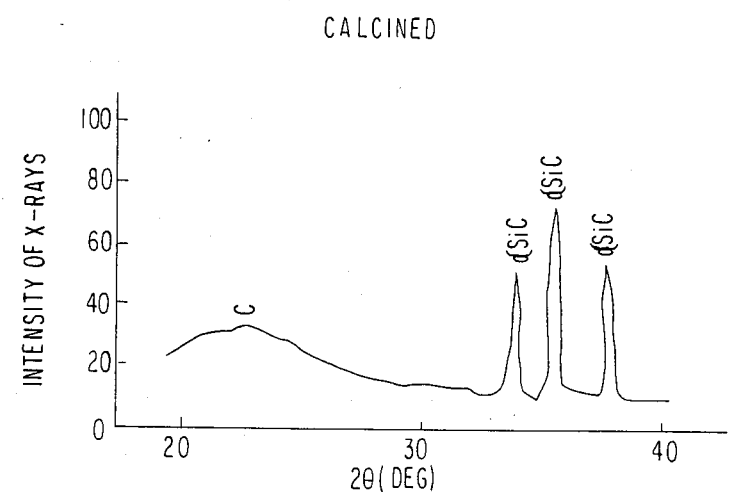
FIGS. 1(a) and 1(b) are graphs showing the X-ray diffractiometry of a calcined (unsintered) sample and a sintered silicon carbide composite sample.
Figure 1B:
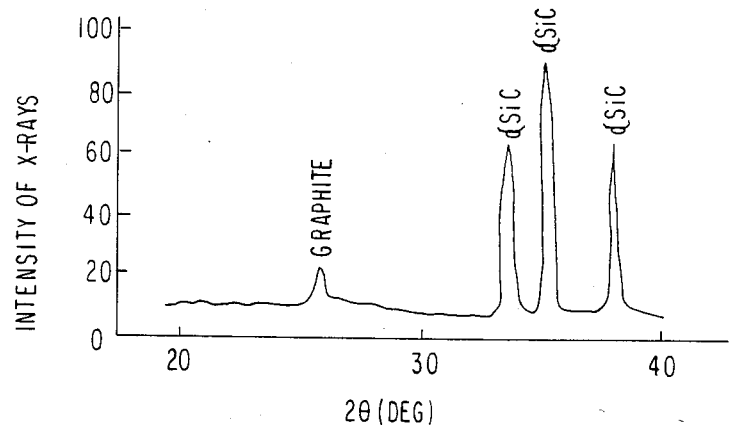

Preferred embodiments of the present invention are:

(1) A silicon carbide-graphite composite material, comprising:

a silicon carbide as a primary phase; and graphite as a secondary phase having an average grain size of not more than 3 μm uniformly dispersed through a grain boundary of the silicon carbide in the composite material where carbon black present in a proportion of 1 to 20 vol% based on the volume of silicon carbide is converted into graphite upon producing the composite material, said composite material having a density greater than 90% of the theoretical density.

(2) A process for producing a silicon carbide-graphite composite material, comprising the steps of:

adding a sintering aid to silicon carbide of an average grain size less than 1 μm, said sintering aid comprising 0.1 to 3.0 wt% of a compound selected from the group consisting of boron, a boron compound which includes a corresponding amount of boron, aluminum and an aluminum compound which includes a corresponding amount of aluminum; and 0.1 to 6.0 wt% of a compound selected from the group consisting of carbon and a carbonacious compound which includes a corresponding amount of carbon each based on the weight of silicon carbide;

further adding carbon black to silicon carbide in an amount of 1 to 20 vol% based on the volume of the silicon carbide;

blending the compositions into an intimate mixture;

molding the intimate mixture to obtain a molded body; and sintering the molded body.

Specifically, the composite material of the present invention has a bending strength at least 20% greater than that of the conventionally sintered product and has thermal shock resistance 90° to 200° C. higher than that of the conventional product. As a further advantage, the carbon black added is converted into graphite during the sintering and becomes dispersed through the grain boundary of silicon carbide of the composite material. Accordingly, the coefficient of kinetic friction of the composite material is reduced by at least 20% compared with the conventional sintered silicon carbide. The graphite forming the secondary phase of the composite material has such a high resistance to corrosion that it will not impair the chemical stability of silicon carbide. The present inventors have found that the average grain size of the graphite forming the secondary phase of the composite material is not more than 3 $\mu$m.

The carbon source used in the present invention in addition to the sintering aids must be carbon black for the following reasons. If the carbon source added is a carbonaceous organic compound such as a phenolic resin, a uniform dispersion may be obtained. However, because of the inherent activity of the phenolic resin as a binder, the molding and subsequent processing of the green body becomes difficult if the phenolic resin is added in an amount greater than 10 wt% based on the weight of the silicon carbide. Furthermore, because almost half of the phenolic resin added evaporates at low temperatures and causes a significant decrease in the green density of the calcined product, the formation of dense product is prevented. If graphite powder, rather than carbon black, is directly added as the carbon source, the effect of inhibiting the grain growth of silicon carbide during sintering is smaller than that of the carbon black. In addition, there is no increase in the bending strength of the final composite material. If less than 1.0 vol% of carbon black based on the volume of silicon carbide is added, various desired effects are not obtained. If, on the other hand, more than 20 vol% of carbon black based on the volume of silicon carbide is used, the sinterability of silicon carbide is impaired and its other desired properties are not maintained.

For the purpose of obtaining a dense composite material, it is most effective to use silicon carbide of a grain size not greater than 1 $\mu$m. By adding 1 to 20 vol%, preferably 1 to 10 vol%, of carbon black based on the volume of silicon carbide, the grain growth of silicon carbide can be inhibited and effective sintering can be achieved. If the amount of carbon black added is less than 1 vol%, the possibility of phase transformation or and grain growth is increased. Using more than 20 Vol% of carbon black causes a reduction in the sintering efficiency, which eventually leads to a product of low quality.

The present invention is hereunder described in greater detail by working examples which are given here for illustrative purposes only and are by no means intended to limit the scope of the invention.

EXAMPLE 1

A wet-mixture of α-silicon carbide powder (average particle size: 0.8 $\mu$m), 0.5 wt% boron carbide, 8.0 wt% phenolic resin based on the weight of silicon carbide and 5 vol% carbon black based on the volume of silicon carbide was prepared while adding water. The mixture was dried, sieved and molded into 30 mm×10 mm×5 mm in this order. The molded body were calcined in nitrogen gas at 800° C. for 60 minutes and subsequently sintered in argon gas atmosphere at 2,100° C. under atmospheric pressure for 60 minutes.

The calcined (unsintered) samples and those of the sintered composite materials were ground into fine particles in an agate mortar. The ground samples were analyzed by an X-ray diffract meter and the results are shown in FIGS. 1(a) and (b), from which one can see that all the carbon black that was initially added was converted into graphite which was distributed through the grain boundary of silicon carbide of the composite material.

EXAMPLE 2

Composite samples were prepared in the same manner as in Example 1 and subjected to grinding. They were then wet-polished with a diamond paste (9 $\mu$m) and observed under optical microscope to check for the dispersion of graphite. The polished surface was then etched with Murakami reagent having the following composition and observed for the sizes of silicon carbide grains and graphite grains disparsed through the grain boundary of silicon carbide.

| The composition of Murakami reagent | |
|---|---|
| Sodium hydroxide | 7 g |
| Potassium ferricyanide | 10 g |
| Water | 100 g |

Figure 2A:
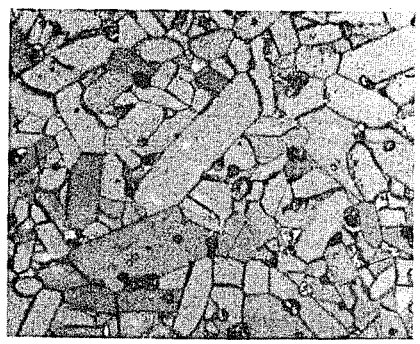
FIGS. 2(a), (b) and (c) show the micrographs of three types of sintered silicon carbide.
Figure 2B:
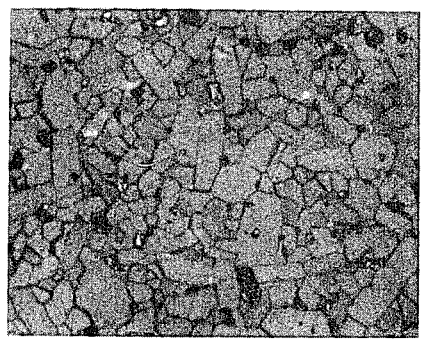
FIG. 2(b) shows the sample prepared from a powder mixture containing graphite.
Figure 2C:
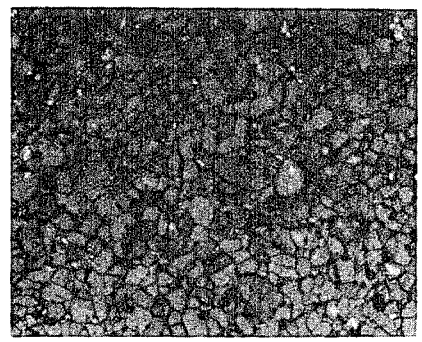
FIG. 2(c) shows the sample prepared from a powder mixture containing carbon black.

The comparative experiment was conducted among composite samples prepared in the same manner as in Example 1, sintered samples prepared in the same manner as in Example 1 except that carbon black was not contained and composite samples prepared in the same manner as in Example 1 except that graphite was contained instead of carbon black. The results are shown in FIG. 2 by micrographs a; (the sample prepared from a powder mixture containing neither carbon black nor graphite), b (the sample prepared from a mixture containing graphite), and c (the sample prepared from a mixture containing carbon black). In the absence of graphite and carbon black, excessive grain growth of silicon carbide occurred. This could be partly inhibited by the addition of graphite, but a composite material having a finer and denser structure could be obtained by addition of carbon black.

EXAMPLE 3

Composite samples were prepared in the same manner as in Example 1 except that the amount of carbon black was varied as shown in Table 1. The bulk densities of the so prepared samples were measured. The samples were then ground into 4 mm×8 mm×25 mm and subjected to a three-point bending test. The results are also shown in Table 1, from which one can see that the samples prepared from powder mixtures containing at least 1 vol% of carbon black had a bending strength at least 20% greater than that of the sample containing no carbon black. When the content of carbon black exceeded 20 vol%, samples having a density greater than 90% of theoretical density could not be obtained. Furthermore, a significant decrease in the bending strength was observed. When graphite rather than carbon black was added, there was no increase in the bending strength no matter how much graphite was added.

TABLE 1

| Sample No. | Additive | Amount (Vol %) | Relative Density (%) | Bending Strength (kg/mm²) |
|---|---|---|---|---|
| 1 | Carbon Black | 0 | 98.5 | 45 |
| 2 | Carbon Black | 1 | 98.5 | 55 |
| 3 | Carbon Black | 3 | 98.5 | 55 |
| 4 | Carbon Black | 5 | 98.0 | 60 |
| 5 | Carbon Black | 10 | 97.0 | 50 |
| 6 | Carbon Black | 20 | 90.0 | 40 |
| 7 | Carbon Black | 30 | 77.0 | 15 |
| 8 | Graphite | 1 | 98.5 | 45 |
| 9 | Graphite | 3 | 98.5 | 43 |
| 10 | Graphite | 5 | 97.5 | 43 |
| 11 | Graphite | 10 | 96.5 | 40 |
| 12 | Graphite | 20 | 88.0 | 35 |
| 13 | Graphite | 30 | 75.0 | 10 |

EXAMPLE 4

Composite samples were prepared in the same manner as in Example 3 and ground into 4 mm × 8 mm × 25 mm. The thermal shock resistance ($\Delta T$) of each sample was measured by the water-quenching method, wherein a sample that had been held at a predetermined temperature (T°C.) for 15 minutes was thrown into water (To°C.) to determine the critical temperature ($\Delta T = T - To$) that caused no decrease in the bending strength of the sample. The results of this test are shown in Table 2, from which one can see that the thermal shock resistance ($\Delta T$) increased as a function of the content of carbon black. The thermal shock resistance of the sample containing 20 vol% of carbon black was as much as 200° C. higher than the corresponding value of the sample containing no carbon black.

TABLE 2

| Sample No. | Additive | Amount (Vol %) | Relative Density (%) | Thermal Shock Resistance $\Delta T$ (°C.) |
|---|---|---|---|---|
| 14 | Carbon Black | 0 | 98.5 | 280 |
| 15 | Carbon Black | 1 | 98.5 | 370 |
| 16 | Carbon Black | 3 | 98.5 | 370 |
| 17 | Carbon Black | 5 | 98.0 | 370 |
| 18 | Carbon Black | 10 | 97.0 | 400 |
| 19 | Carbon Black | 20 | 90.0 | 480 |
| 20 | Carbon Black | 30 | 77.0 | 480 |

EXAMPLE 5

Composite sintered rings (outside diameter 30 mm, inside diameter 20 mm, thickness 5 mm) were prepared in the same manner as in Example 3. After grinding their sliding faces, the sliding faces were wet-polishing with a diamond paste (9 μm) and subjected to a wet-sliding test under the following conditions:

Tester: Mechanical seal type (ring-on-ring system)
Lubricant: Water
Sliding velocity: 100 m/min.
Surface Pressure: 7 kg/cm²
Test period: 100 hr.

The results of the wet-sliding test are shown in Table 3, from which one can see that the samples prepared from powder mixtures containing at least 1 vol% of carbon black had coefficients of kinetic friction at least 20% smaller than the sample containing no carbon black. This reduction in the friction coefficient was accompanied by a 50% reduction in the resulting wear. However, it has been found that addition of 30 vol% or higher of carbon black makes it impossible to sinter up to 80% or higher of theoretical density, and causes increases in the coefficient of kinetic friction and the wear.

TABLE 3

| Sample No. | Additive | Amount (Vol %) | Relative Density (%) | Kinetic Coefficient of Friction | Wear (× $10^{-9}$ mm³/mm Kg) |
|---|---|---|---|---|---|
| 21 | Carbon Black | 0 | 98.5 | 0.0050 | 6 |
| 22 | Carbon Black | 1 | 98.5 | 0.0040 | 3 |
| 23 | Carbon Black | 3 | 98.5 | 0.0035 | 3 |
| 24 | Carbon Black | 5 | 98.0 | 0.0030 | 3 |
| 25 | Carbon Black | 10 | 97.0 | 0.0030 | 3 |
| 26 | Carbon Black | 20 | 90.0 | 0.0040 | 4 |
| 27 | Carbon Black | 30 | 77.0 | 0.0200 | 11 |

The foregoing data shows that the present invention provides a silicon carbide-graphite composite material having improved friction coefficient, bending strength and thermal shock resistance.

While the invention has been described in detail and with reference to specific embodiments thereof, it will be apprent to one skilled in the art that various changes and modifictions can be made therein without departing from the spirit and the scope thereof.

What is claimed is:

1. A process for producing a silicon carbide-graphite composite material, comprising:

adding a sintering aid to silicon carbide of an average grain size less than 1 μm, said sintering aid comprising 0.1 to 3.0 wt% of a compound selected from the group consisting of boron and a boron compound which includes a corresponding amount of boron; and 0.1 to 6.0 wt% of an organic carbonaceous compound which includes a corresponding amount of carbon each based on the weight of silicon carbide;

further adding carbon black as a silicon carbide grain growth inhibitor to silicon carbide in an amount of 1 to 20 vol% based on the volume of the silicon carbide;

blending the compositions into an intimate mixture;

molding the intimate mixture to obtain a molded body; and sintering the molded body at about atmospheric pressure.

2. A process as claimed in claim 1, wherein said molded body is sintered at atmospheric pressure.

3. A process as claimed in claim 1, wherein said organic carbonaceous compound is a phenolic resin.

4. A process as claimed in claim 1, wherein said organic carbonaceous compound is one which can supply carbon obtained by decomposition of an organic compound as a carbon component of sintering aids.

5. A process as claimed in claim 1, wherein said sintering aid contains the boron.

6. A process as claimed in claim 1, wherein said sintering aid contains the boron compound which includes a corresponding amount of of boron.

7. A process is claimed in claim 1, wherein the resultant composite material has great shock resistance and bending strength, and a reduced coefficient of kinetic friction.

8. A process is claimed in claim 1, wherein said carbon black converts to graphite during sintering.

9. A process as claimed in claim 7, wherein said graphite comprises a secondary phase of the resultant composite material.

10. A process is claimed in claim 9, wherein said graphite which comprises a secondary phase of the resultant composite material has a high heat resistance and does not impair the chemical stability of the silicon carbide.

* * * * *